United States Patent
Tanaka et al.

(10) Patent No.: US 9,073,211 B2
(45) Date of Patent: Jul. 7, 2015

(54) CONTROL SYSTEM AND TEACHING METHOD FOR SEVEN-AXIS ARTICULATED ROBOT

(75) Inventors: Hidenori Tanaka, Nishinomiya (JP); Takamasa Ogata, Kobe (JP); Tetsuya Kubota, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 84 days.

(21) Appl. No.: 13/977,281

(22) PCT Filed: Dec. 21, 2011

(86) PCT No.: PCT/JP2011/007156
§ 371 (c)(1),
(2), (4) Date: Aug. 27, 2013

(87) PCT Pub. No.: WO2012/090440
PCT Pub. Date: Jul. 5, 2012

(65) Prior Publication Data
US 2013/0345866 A1 Dec. 26, 2013

(30) Foreign Application Priority Data
Dec. 28, 2010 (JP) ................................ 2010-292743

(51) Int. Cl.
*G05B 19/4155* (2006.01)
*B25J 9/16* (2006.01)
*G05B 19/425* (2006.01)

(52) U.S. Cl.
CPC ............. *B25J 9/1664* (2013.01); *G05B 19/425* (2013.01); *G05B 2219/39032* (2013.01); *G05B 2219/40074* (2013.01); *G05B 2219/39414* (2013.01)

(58) Field of Classification Search
CPC ...... B25J 9/1664; B25J 9/1658; B25J 9/1661; B25J 9/1666; B25J 9/1669; B25J 9/1671; G05B 19/425; G05B 2219/39032; G05B 2219/39414; G05B 2219/40074; G05B 19/421; G05B 19/423; G05B 19/427
USPC .......................... 700/250, 254, 257, 262, 264
See application file for complete search history.

(56) References Cited

U.S. PATENT DOCUMENTS

| | | | | |
|---|---|---|---|---|
| 4,967,126 A | * | 10/1990 | Gretz et al. | 318/568.19 |
| 4,975,856 A | * | 12/1990 | Vold et al. | 700/263 |
| 6,408,224 B1 | * | 6/2002 | Okamoto et al. | 700/245 |
| 6,642,922 B1 | * | 11/2003 | Noda | 345/419 |
| 2011/0093119 A1 | * | 4/2011 | Park et al. | 700/254 |

FOREIGN PATENT DOCUMENTS

| | | |
|---|---|---|
| JP | A-H06-226667 | 8/1994 |
| JP | A-2009-125892 | 6/2009 |
| JP | A-2009-226552 | 10/2009 |

OTHER PUBLICATIONS

International Search Report issued in Application No. PCT/JP2011/007156; Dated Mar. 13, 2012 (With Translation).

* cited by examiner

*Primary Examiner* — Stephen Holwerda
(74) *Attorney, Agent, or Firm* — Oliff PLC (57) ABSTRACT

A control system and teaching method for a seven-axis articulated robot are provided, which system and method are capable of easily grasping a motion trajectory of the whole robot and thereby performing proper teaching during teaching operation. The control system includes a setting device for setting a specified plane in a teaching mode for teaching a seven-axis articulated robot; a control unit for controlling the movement of the seven-axis articulated robot so as to restrict a motion trajectory of an elbow portion within the plane set by the setting device; and a computing unit for performing inverse transform operation to calculate the pivot angle of each pivot axis based on a change in a position of the hand end, setting the restriction of the movement of the elbow portion as a constraint condition, when the position for the hand end is taught.

5 Claims, 5 Drawing Sheets

Fig. 5B

CONTROL SYSTEM AND TEACHING METHOD FOR SEVEN-AXIS ARTICULATED ROBOT

TECHNICAL FIELD

The invention relates to a control system and teaching method for a seven-axis articulated robot, and more particularly to control of movement of an elbow portion of a seven-axis articulated robot during teaching.

BACKGROUND ART

In recent years, there have been developed seven-axis articulated robots which have one more axis (redundant axis) than used in conventionally, widely-used six-axis articulated robots. In seven-axis articulated robots, the pivot angle of the pivot axis of each joint is obtained from the position and posture of a wrist by inverse transform operation similarly to the case of six-axis articulated robots. However, in the seven-axis articulated robots, the pivot position of each axis is not determined uniquely by specifying the position and posture of the wrist, although in the six-axis articulated robots, the pivot position of each axis is uniquely determined by specifying the position and posture of the wrist. The reason for this is that the presence of the redundant axis allows the elbow portion to change its position with a hand end kept at a position. Therefore, in the seven-axis articulated robots, it is necessary to teach not only the position and posture of the wrist but also the position and posture of the whole of the articulated robot, when taking account of influences upon obstacles surrounding the robot.

There are known methods for controlling a seven-axis articulated robot. In one method, control is performed with the redundant axis being fixed (see e.g., Patent Literature 1). Another control method is such that control is performed with the angle of the elbow portion kept constant. There is also known a teaching method for a seven-axis articulated robot in which an operating zone of a robot arm is divided into a plurality of regions and a reference position and a reference posture for the robot arm for every divided region are taught beforehand (see e.g., Patent Literature 2).

CITATION LIST

Patent Literature

Patent Literature 1: JP-A-2009-125892
Patent Literature 2: JP-A-2009-226552

SUMMARY OF INVENTION

Technical Problem

However, the control performed with the redundant axis being fixed such as the control disclosed in Patent Literature 1 has revealed a problem that the seven-axis articulated robot can exert only the function of the six-axis articulated robot, so that satisfactory teaching cannot be expected. Also, the control in which the angle of the elbow portion is kept constant fails in performing proper teaching, because the position of the elbow portion significantly fluctuates, which leads to considerable fluctuations in the posture of the whole robot. In the method disclosed in Patent Literature 2, trial and error is needed to teach the reference position and reference posture of the robot arm for every divided region. In addition, the parts such as the elbow portion still move in directions unexpected by an operator, thereby giving rise to a possibility of interference with surrounding devices. To avoid this, the operational speed of the robot needs to be reduced when performing a teaching operation, which makes the teaching troublesome. Furthermore, the resultant robotic movement presents a problem that whenever the position of the wrist comes into a new region, the robot has to take the reference position and reference posture set for the region. Thus, this method involves useless movement of the robot, which leads to a prolonged operation time.

The invention is directed to overcoming the above problem and an object of the invention is therefore to provide a control system and teaching method for a seven-axis articulated robot, which system and method are capable of performing proper teaching by easily grasping a motion trajectory of the whole robot during teaching operation.

Solution to Problem

According to the invention, there is provided a control system for a seven-axis articulated robot having a hand end provided at a leading end thereof and seven joints arranged in series from a base to the hand end, the seven joints having pivot axes respectively and being configured such that every joint is pivotable about the pivot axis of a subsequent joint, whereby a three-axis shoulder portion, a one-axis elbow portion and a three-axis wrist portion are arranged in series from the base, the control system comprising:

a setting device for setting a specified plane in a teaching mode for teaching the seven-axis articulated robot;

a control unit for controlling movement of the seven-axis articulated robot so as to restrict a motion trajectory of the elbow portion within the plane set by the setting device; and a computing unit for performing inverse transform operation to calculate the pivot angle of each pivot axis based on a change in a position of the hand end, using restriction of the movement of the elbow portion as constraint condition, when the position for the hand end is taught.

The above arrangement makes it possible to restrict the movement of the elbow portion within a specified plane when teaching a position for the hand end, the elbow portion having the greatest influence next to the hand end upon the movement of the whole of the robot. This makes it easy to have an image of the motion trajectory of the elbow portion during the teaching operation so that the motion trajectory of the whole robot can be easily grasped and, in consequence, adequate teaching can be performed.

The plane within which the movement of the elbow portion is restricted may be a plane obtained by fixing a coordinate of one of the coordinate axes of a base coordinate system to a specified value, the base coordinate system being set based on the base of the seven-axis articulated robot or, a plane obtained by fixing a coordinate of one of the coordinate axes of a tool coordinate system to a specified value, the tool coordinate system being set based on the hand end of the seven-axis articulated robot.

The plane within which the movement of the elbow portion is restricted may be a plane obtained by fixing a coordinate of a height direction axis among the coordinate axes of the base coordinate system to a specified value, and the computing unit may perform the inverse transform operation, using as constraint condition, a condition in which the pivot angle of a pivot axis, which is parallel to the plane of the base and is among the pivot axes of the shoulder portion, is constant.

The setting device may be configured to set the specified plane when a specified setting button provided in an input device used for teaching the seven-axis articulated robot is operated with the elbow portion being situated in a specified position, so that the movement of the elbow portion is restricted within the plane including the specified position. This makes it possible to properly and easily set the plane that restricts the movement of the elbow portion, taking account of actual obstacles.

According to the invention, there is provided a teaching method for a seven-axis articulated robot having a hand end provided at a leading end thereof and seven joints arranged in series from a base to the hand end, the seven joints having pivot axes respectively and being configured such that every joint can pivot about the pivot axis of the preceding adjacent joint whereby a three-axis shoulder portion, a one-axis elbow portion and a three-axis wrist portion sectionrranged in series from the base, the teaching method comprising:

a setting procedure for setting a specified plane;

a controlling procedure for controlling movement of the seven-axis articulated robot such that a motion trajectory of the elbow portion is restricted within the plane; and a calculating procedure for performing inverse transform operation to calculate the pivot angle of each pivot axis based on a change in a position of the hand end, using restriction of the movement of the elbow portion as a constraint condition, if the position for the hand end is taught.

These objects as well as other objects, features and advantages of the invention will become apparent to those skilled in the art from the following detailed description of a preferred embodiment with reference to the accompanying drawings.

Advantageous Effect of Invention

The invention is configured as described above and has an advantage that a motion trajectory of the whole robot can be easily grasped and proper teaching can be performed during teaching operation.

DESCRIPTION OF EMBODIMENT

Referring now to the accompanying drawings, an embodiment of the invention will be described. In all these figures, those parts that are substantially equivalent or function substantially similarly to one another are indicated by the same reference numerals and redundant descriptions are avoided.

Figure 1:
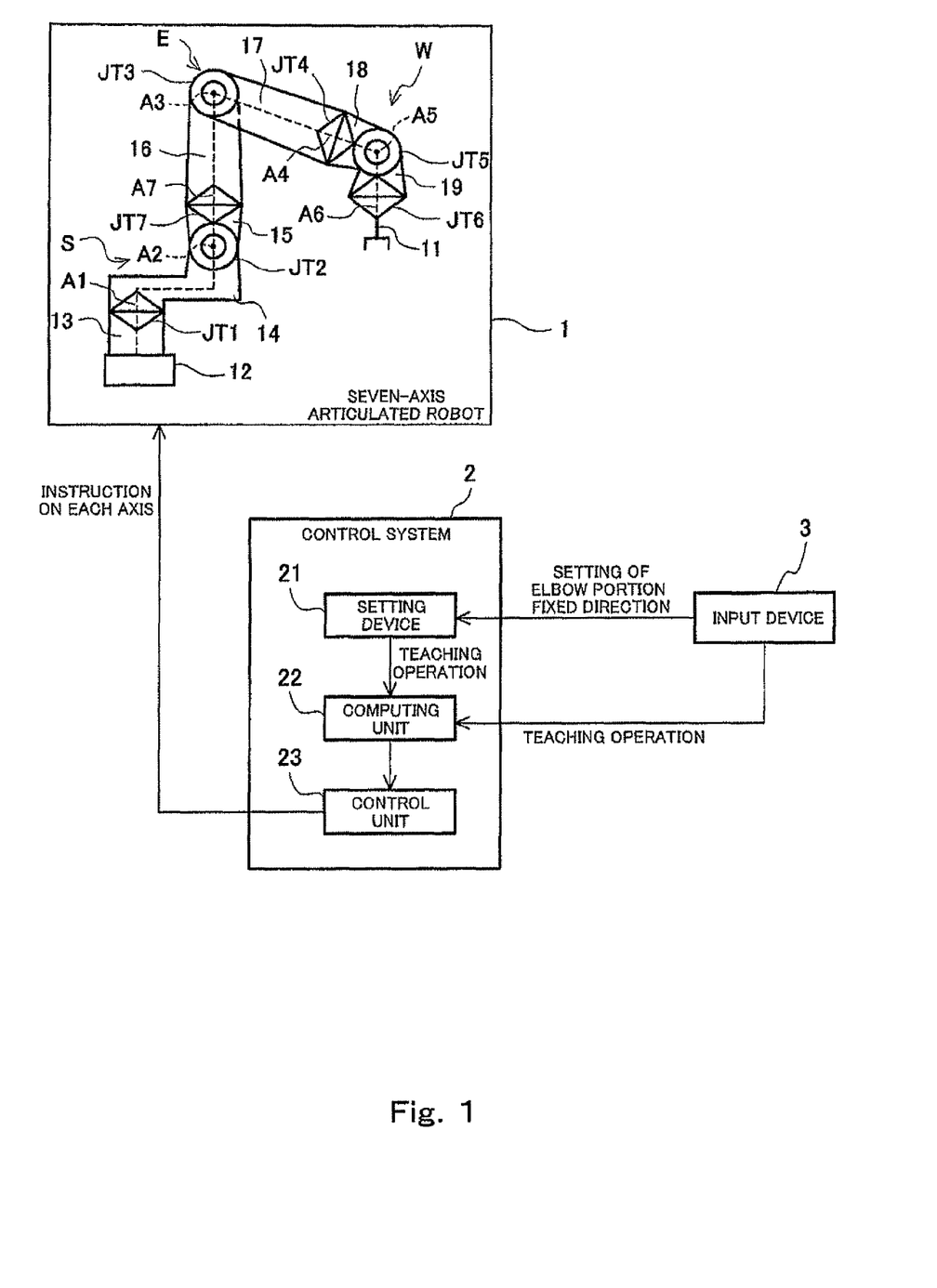
FIG. 1 is a block diagram showing a configuration of a robot system including a seven-axis articulated robot and a robot control system according to one embodiment of the invention.

FIG. 1 is a block diagram showing a configuration of a robot system including a seven-axis articulated robot and a robot control system according to one embodiment of the invention. As shown in FIG. 1, a robot control system 2 according to this embodiment is used for controlling movement of a seven-axis articulated robot 1 having seven pivot axes (motion axes). The seven-axis articulated robot 1 has a hand end 11 located at a leading end thereof and seven joints JT1, JT2, JT7, JT3, JT4, JT5, JT6 which sectionrranged in series from a base 12 to the hand end 11. The seven joints JT1 to JT7 have pivot axes A1 to A7 respectively. The seven-axis articulated robot 1 is configured such that every joint can pivot about the pivot axis A1, A2, A3, A4, A5, A6 or A7 of a subsequent adjacent joint (that is, the pivot axes of adjacent joints are substantially perpendicular to each other), so that a three-axis shoulder portion S, a one-axis elbow portion E and a three-axis wrist portion W are constructed so as to be arranged in series this from the base 12. It should be noted that the seven-axis articulated robot 1 of this embodiment is an upright articulated robot of the so-called floor type in which the base 12 is installed on a floor surface under a work space. The seven-axis articulated robot 1 is placed on the base 12 and has a swivel 13 that is constituted as the first joint JT1 and arm members (link members) 14 to 19 each provided between every two joints.

More specifically, in this embodiment, the seven-axis articulated robot I is configured such that in a six-axis articulated robot which has the six joints JT1 to JT6 arranged in series from the base 12 to the hand end 11 and in which the six joints JT1 to JT6 have first to sixth pivot axes A1 to A6 respectively, and each joint can pivot about the pivot axis of its subsequent adjacent joint, it further includes the seventh pivot axis A7 of the seventh joint JT7 as a redundant axis, the seventh pivot axis A7 being located between the second joint JT2 (second pivot axis A2) and the third joint JT3 (third pivot axis A3), and the seventh pivot axis A7 of the seventh joint JT7 is perpendicular to the second pivot axis A2 and the third pivot axis A3.

Various tool members such as attachments, hands, tools and end effectors are mounted to the sixth pivot axis A6, thereby forming the hand end 11.

The seven-axis articulated robot 1 of this embodiment is configured such that the three pivot axes A4 to A6, which constitute a wrist portion W, intersect one another at one point whereas the pivot axes A1, A2, A7, which constitute a shoulder portion S, do not intersect one another at one point and such that the second pivot axis A2 and the seventh pivot axis A7 are offset from the first pivot axis A1.

The robot system of this embodiment has a control system 2 for controlling the movement of the seven-axis articulated robot 1. More concretely, the control system 2 servo-controls servo motors included in the first to seventh joints JT1 to JT7 of the seven-axis articulated robot 1, thereby causing the hand end 11 to move to a desired position through a desired path and to assume a desired posture. In the control system 2 of this embodiment, the position of each joint (each pivot axis) of the seven-axis articulated robot 1 is plotted in a base coordinate system that is an orthogonal coordinate system having the base 12 as an origin and in a tool coordinate system that is an orthogonal coordinate system having the hand end 11 as an origin.

The first to seventh joints JT1 to JT7 of the seven-axis articulated robot 1 are each provided with the servo motor and a position detector (both are not shown). The position detector is constituted by, for example, a rotary encoder. Each servo motor is actuated in response to a control command issued from the control system 2, whereby pivotal movements of the first to seventh joints JT1 to JT7 about the first to seventh pivot axes A1 to A7 are performed. The servo motors can be actuated independently from one another. Upon the actuation of the servo motors, the respective pivot angles (pivot positions)

of the servo motors about the pivot axes A1 to A7 are detected by their associated position detectors.

The robot system of this embodiment further includes an input device 3 for teaching the movement of the seven-axis articulated robot 1. The input device 3 is constituted by, for example, a teaching pendant (the details of which will be described later). In accordance with instructions for teaching operation inputted by the input device 3, the control system 2 executes a teaching mode and calculates the pivot angles (pivot positions) of the pivot axes A1 to A7 of the seven-axis articulated robot 1.

The control system 2 includes a setting device 21 for setting a specified plane Pz (described later) in a teaching mode in which teaching of the seven-axis articulated robot 1 is performed; a control unit 23 for controlling the movement of the seven-axis articulated robot 1 so as to restrict a motion trajectory of the elbow portion E within the plane Pz set by the setting device 21; and a computing unit 22 for performing inverse transform operation to calculate the pivot angles of the pivot axes A1 to A7 based on a change in a position of the hand end 11, using restriction of the movement of the elbow portion E as constraint condition, when the position and posture of the hand end 11 are taught. The control system 2 includes, for example, a microcontroller. The CPU of this microcontroller may serve as the setting device 21, the computing unit 22 and the control unit 23, whereas an internal memory of the microcomputer may serve as a storage unit for storing various kinds of data and a program for performing arithmetic operations described later.

After the operator operates the input device 3 and teaching operation (operating command) for the seven-axis articulated robot 1 is inputted to the control system 2 in accordance with the operation performed by the operator, the computing unit 22 calculates a target position for the hand end 11 in which the hand end 11 should be present, in accordance with the input teaching operation. This target position is calculated based on an operation time, and a moving distance obtained from a setting value of the moving speed of the hand end 11, etc. Further, the computing unit 22 performs inverse transform operation to calculate the pivot angles of the pivot axes A1 to A7 based on the target position. Then, the control unit 23 calculates command values indicating operating amounts for the respective servo motors provided in the first to seventh joints JT1 to JT7 to send to the servo motors. These commands are calculated based on a deviation between the calculated pivot angle for each pivot axis A1, A2, A3, A4, A5, A6 or A7 and the pivot position of the pivot axis A1, A2, A3, A4, A5, A6 or A7 before movement. In this way, the hand end 11 moves to the target position.

The control system 2 has the teaching mode for performing teaching operation on the seven-axis articulated robot 1 in the robot system of this embodiment. In the teaching mode, the control system 2 sequentially teaches positions for the hand end 11 of the seven-axis articulated robot 1, using the input device 3 so that the pivot angles for the respective pivot axes A1 to A7 are calculated whenever the position is taught.

Figure 2:
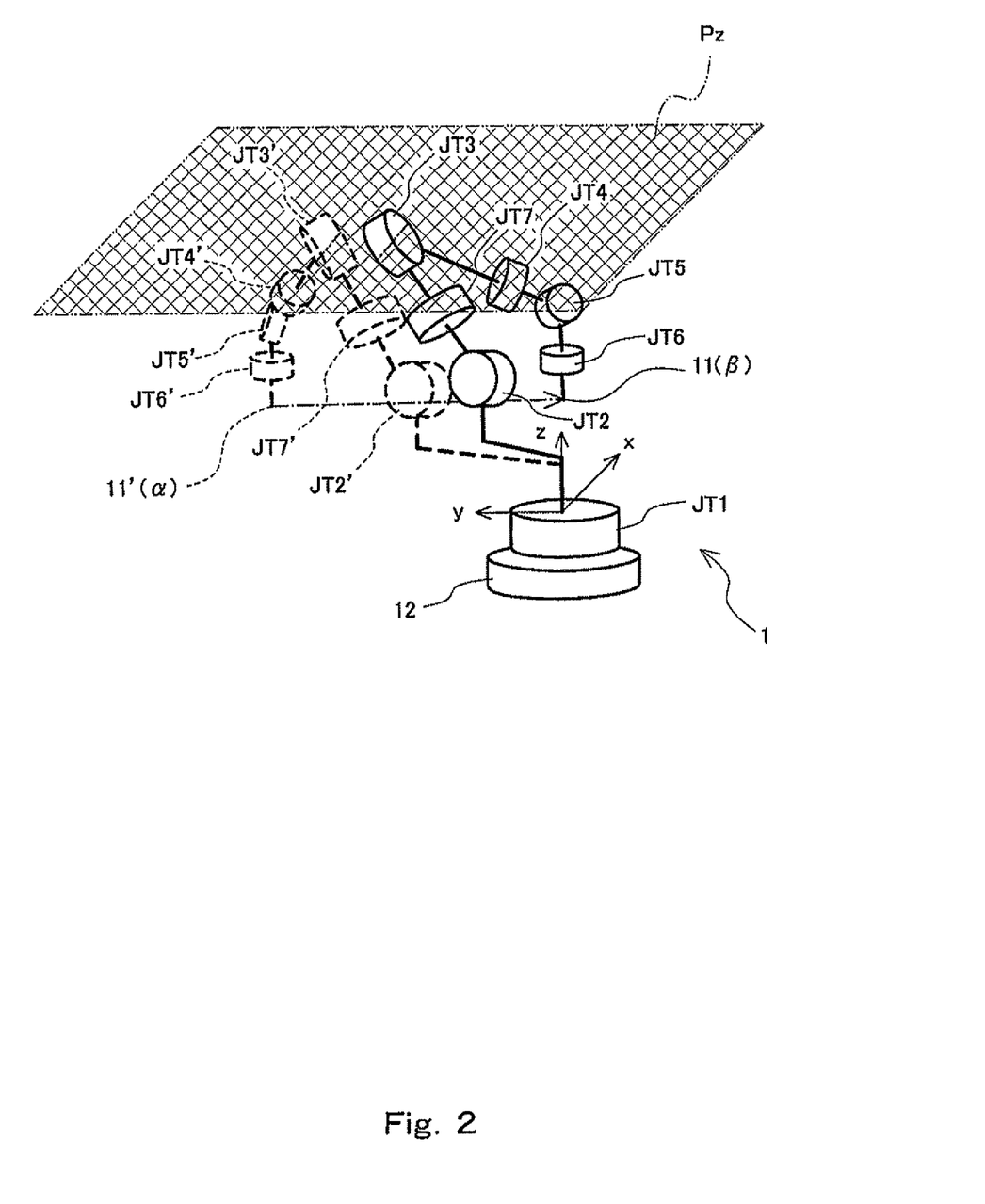
FIG. 2 is a conceptual diagram showing a motion trajectory of the seven-axis articulated robot in the robot system shown in FIG. 1.

FIG. 2 is a conceptual diagram showing a motion trajectory of the seven-axis articulated robot in the robot system shown in FIG. 1. FIG. 2 shows the motion of the joints when moving from their respective joint positions indicated by broken line to their respective joint positions indicated by solid line (the positions of the joints and the hand end different from those after change are designated by JT2' to JT7' and 11', respectively). This movement is aimed for shifting the hand end 11, by a predetermined distance in the direction of the Y axis, from a position α of the hand end 11' indicated by broken line to a position β. In the teaching mode of the seven-axis articulated robot 1, the control system 2 of this embodiment performs control such that the motion trajectory of the elbow portion E is restricted within the specified plane Pz based on operator input received from the input device 3. For example, as shown in FIG. 2, the control system 2 controls the motion trajectory of the elbow portion E so as to be restricted within the plane Pz (which is in parallel with the XY plane including the X-axis and Y-axis of the base coordinate system), the plane Pz being obtained when the coordinate of the Z-axis (i.e., the height direction axis) of the base coordinate system is fixed to a specified value. More specifically, the control system 2 performs control such that when moving the hand end 11 from the position α to the position β, the third joint JT3, which constitutes the elbow portion E, moves within the plane Pz.

Figure 3:
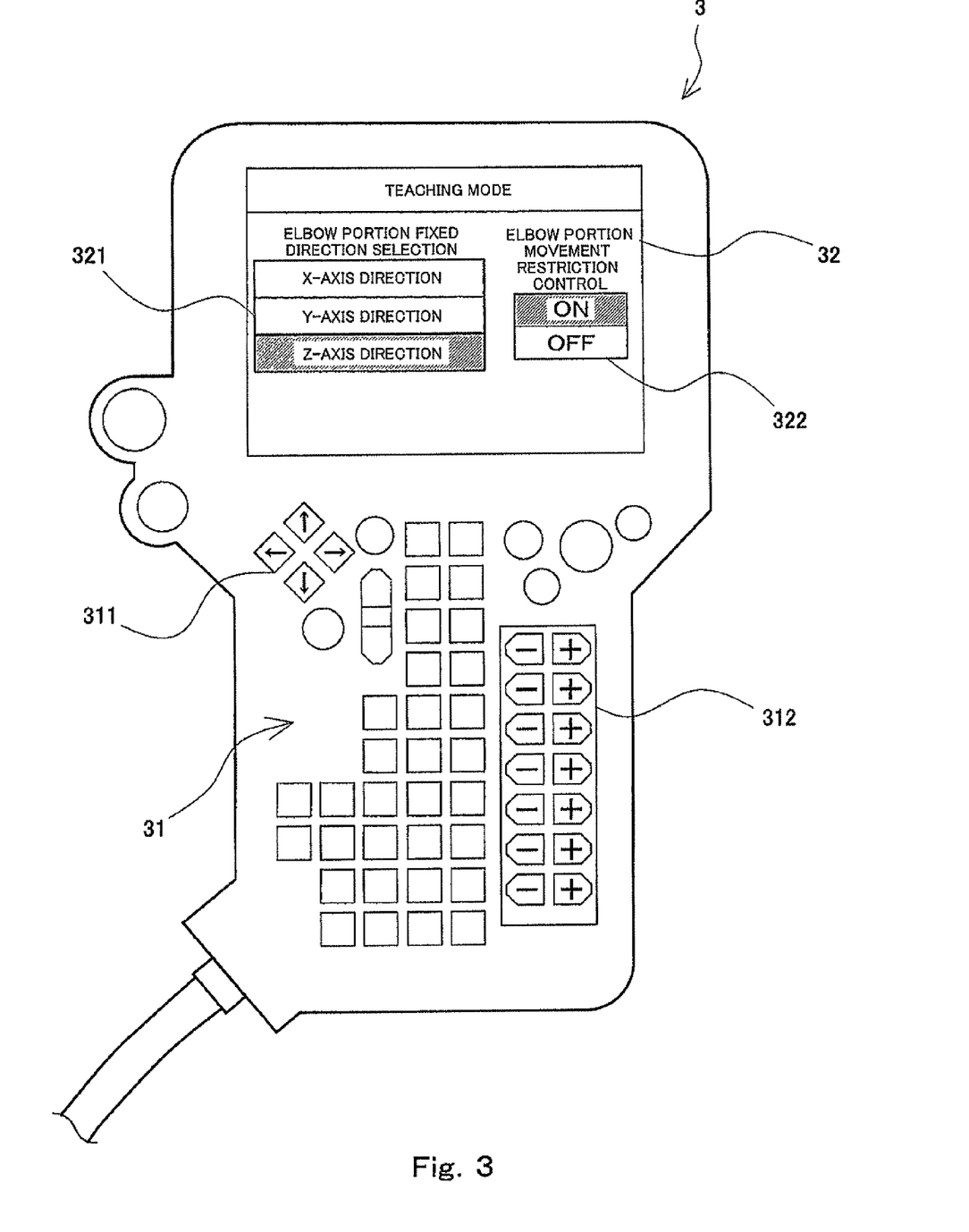
FIG. 3 is a plan view showing a schematic configuration of an input device in the robot system shown in FIG. 1.

FIG. 3 is a plan view showing a schematic configuration of the input device in the robot system shown in FIG. 1. As shown in FIG. 3, the input device 3 of this embodiment includes an input button group 31 used for inputting various operational instructions; and a touch panel 32 that displays a variety of information such as input results, basis settings, etc. and enables input of various settings. Thus, the input device 3 is configured to input teaching instructions for the seven-axis articulated robot 1 by use of the input button group 31 and the touch panel 32. The input button group 31 includes input buttons 311 used for, e.g., operation of a cursor displayed on the touch panel 32; and button columns 312 constituted by plural pairs of plus (+) and minus (−) input buttons. The button columns 312 constituted by plural button pairs enable the hand end 11 to move in a specified direction by inputting a plus (+) or minus (−) command, for example, for every translational coordinate axis of the base coordinate system and every direction of pivot around each axis. The button columns 312 also enable movement of the joints JT1 to JT7 by inputting a plus (+) or minus (−) command for each of the joints JT1 to JT7. Switching between the functions of the button columns 312 constituted by plural button pairs is executed by input operation of the touch panel 32 or other buttons of the input button group 31.

In the teaching mode, the touch panel 32 displays an elbow portion fixed direction selection touch input section 321 used for specifying a fixed direction (i.e., an axis direction relative to which a coordinate is fixed) for the plane that restricts the movement of the elbow portion E. The touch panel 32 also displays a movement restriction control on-off switch touch input section 322 used for determining whether or not control for restricting the movement of the elbow portion E (movement restriction control) is to be performed. Instructions can be inputted by touching these displayed input sections. Specifically, the fixed direction is specified by selecting any one of the coordinate axes of the base coordinate system displayed in the elbow portion fixed portion direction selection touch input section 321 (Note that the Z-axis is selected in FIG. 3).

By turning ON the movement restriction control on-off switch touch input section 322 in a state in which the elbow portion E is located at a desired position by operating the input device 3, the position coordinate of the elbow portion E in the coordinate axis selected by the elbow portion fixed direction selection touch input section 321 is fixed. Specifically, the plane including the position of the elbow portion E determined when turning ON the movement restriction control on-off switch touch input section 322 is set as the plane that restricts the movement of the elbow portion E (elbow portion movement restricting plane), and the movement of the elbow portion E is restricted within this pane (i.e., the plane set by the elbow portion fixed direction selection touch input section 321). This makes it possible to properly and easily set the plane that restricts the movement of the elbow portion E, taking account of actual obstacles.

Figure 4:
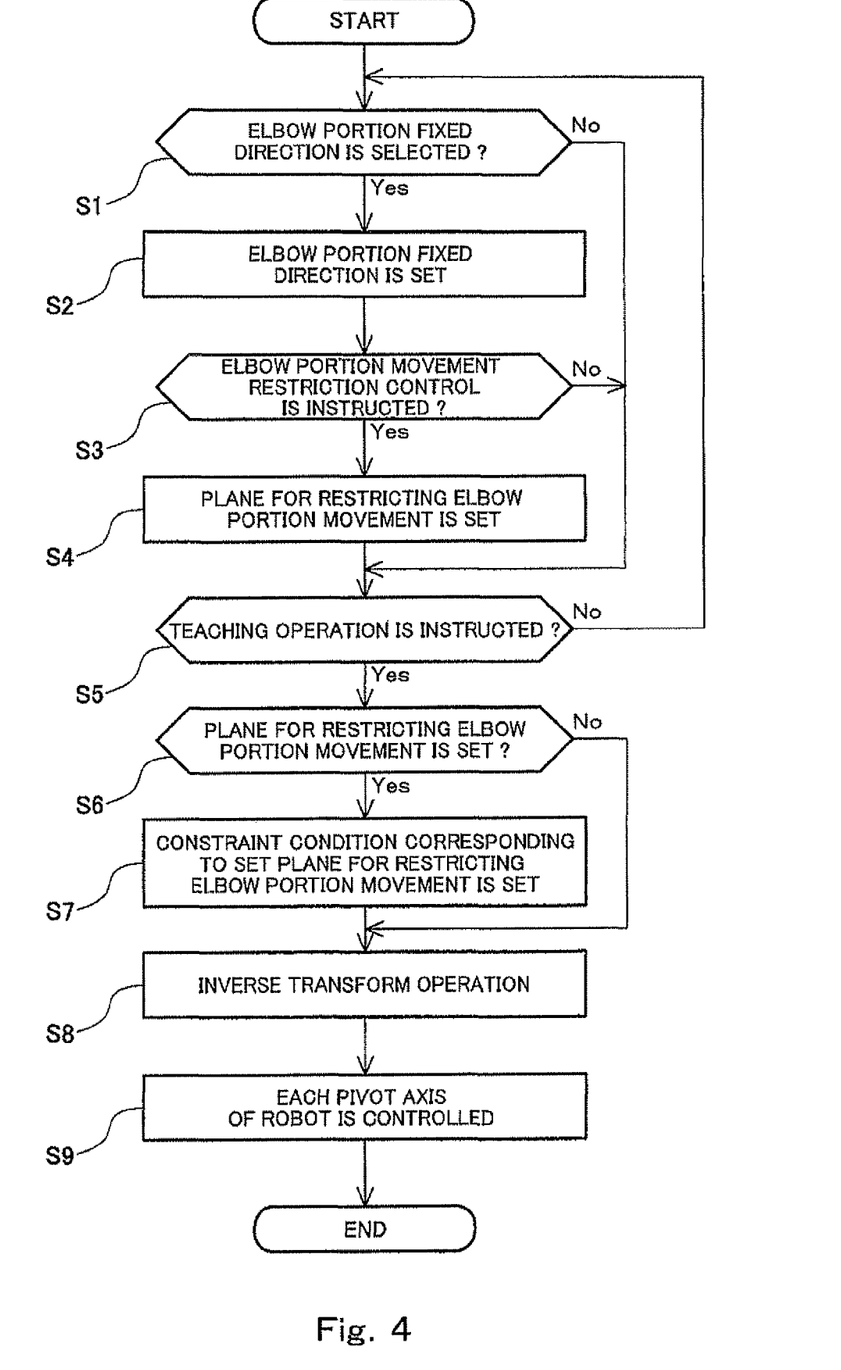
FIG. 4 is a flow chart showing a flow of a teaching mode in the robot control system shown in FIG. 1.

The steps in the teaching mode are sequentially explained below. FIG. 4 is a flow chart showing a flow of the teaching mode in the robot control system shown in FIG. 1. First, the control system 2 determines whether or not a fixed direction has been selected by the elbow portion fixed direction selection touch input section 321 of the input device 3 (STEP S1). If a fixed direction has not been selected (No at STEP S1), the flow proceeds to STEP S5 which will be described later. If a fixed direction has been selected by the input device 3 (Yes at STEP S1), the fixed direction is set (STEP S2). In the example shown in FIGS. 2 and 3, the z-axis is set as the fixed direction. After a turn-on command for the elbow portion movement restriction control is input by the elbow portion movement restriction control on-off switch touch input section 322 of the input device 3 (STEP S3), the control system 2 sets the elbow portion movement restricting plane (Pz) (STEP S4). If a turn-off command for the restriction control is input, the flow proceeds to STEP S5 as will be described later.

The control system 2 also determines whether or not a command to perform a teaching operation has been input through operation of the button columns 32 constituted by plural button pairs of the input device 3 (STEP S5). If a command to perform a teaching operation is not inputted (No at STEP S5), the flow returns to STEP S1. If a command to perform a teaching operation has been input (Yes at STEP S5), the control system 2 determines whether the elbow portion movement restricting plane (Pz) for restricting the movement of the elbow portion E has been set (STEP S6). If the movement restricting plane has not been set (No at STEP 1 or STEP 3 and No at STEP S6), the control system 2 functions as the computing unit 22 to perform ordinary inverse transform operation without setting constraint condition used for restricting the movement of the elbow portion E and to calculate the pivot angles of the pivot axes A1 to A7 based on the position of the hand end 11 (STEP S8).

On the other hand, if the elbow portion movement restricting plane (Pz) has been set (Yes at STEP S6), the control system 2 sets the constraint condition corresponding to the set elbow portion movement restricting plane (Pz) (STEP S7). Then, the control system 2 functions as the computing unit 22 to perform inverse transform operation with the restriction of the movement of the elbow portion E being set as constraint condition and to calculate the pivot angles of the pivot axes A1 to A7 based on the change of the position of the hand end 11 (STEP S8). In the inverse transform operation, in accordance with the constraint condition, equations for obtaining an analytical solution are selectively used, or a convergence condition for convergent calculation is altered.

For example, in cases where the elbow portion movement restricting plane for restricting the movement of the elbow portion E is the plane Pz in which the coordinate in the z-axis is fixed, as exemplified in FIGS. 2 and 3, the control system 2 serving as the computing unit 22 performs inverse transform operation under constraint condition in which the pivot angle of the pivot axis A2 is constant, the pivot axis A2 being among the pivot axes A1, A2, A7 that constitute the shoulder portion S and being parallel to the plane of the base 12 (i.e., the XY plane of the base coordinate system). That is, the z-axis coordinate of the elbow portion E is determined by only the pivot angle of the pivot axis A2 of the second joint JT2, and therefore the motion trajectory of the elbow portion E can be restricted within the elbow portion movement restricting plane Pz by adopting a constraint condition in which the pivot axis A2 is fixed to a specified value.

If a plane Px obtained by fixing the x-axis coordinate or a plane By obtained by fixing the y-axis coordinate is set as the elbow portion movement restricting plane for restricting the movement of the elbow portion B, a a constraint condition is applied to the pivot axis A1 of the first joint JT1 and the pivot axis A2 of the second joint JT2, thereby similarly restricting the motion trajectory of the elbow portion E within the plane Px or Py.

Figure 5A:
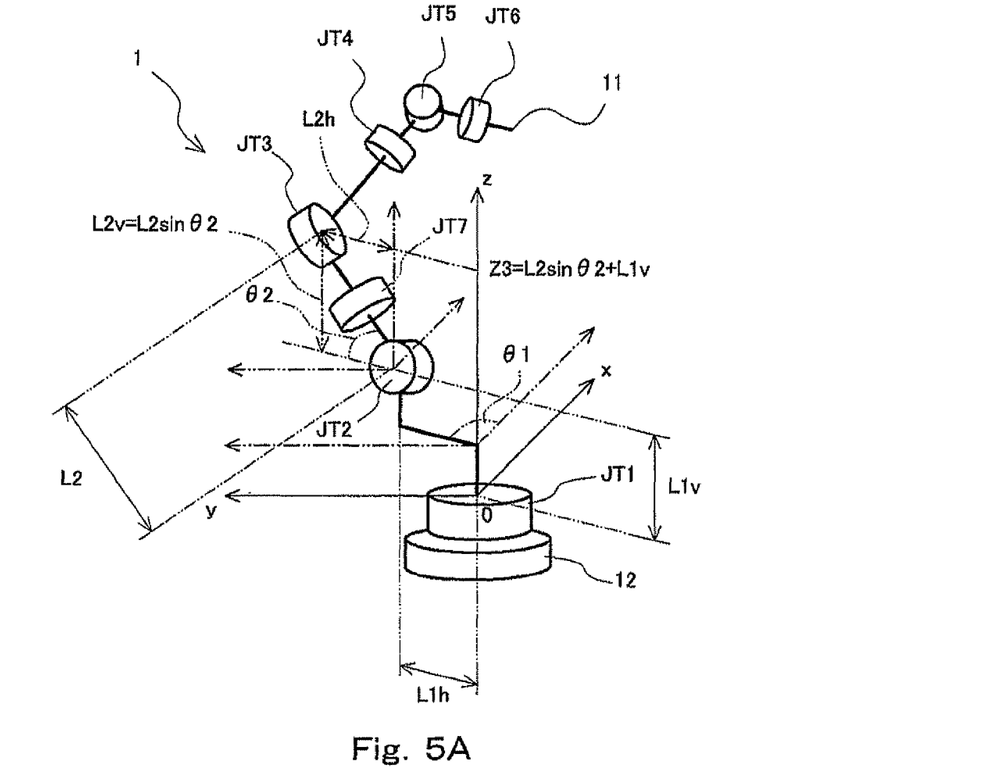
FIG. 5A is a conceptual diagram (perspective view) illustrating a position of an elbow portion of the seven-axis articulated robot in the robot system shown in FIG. 1.
Figure 5B:
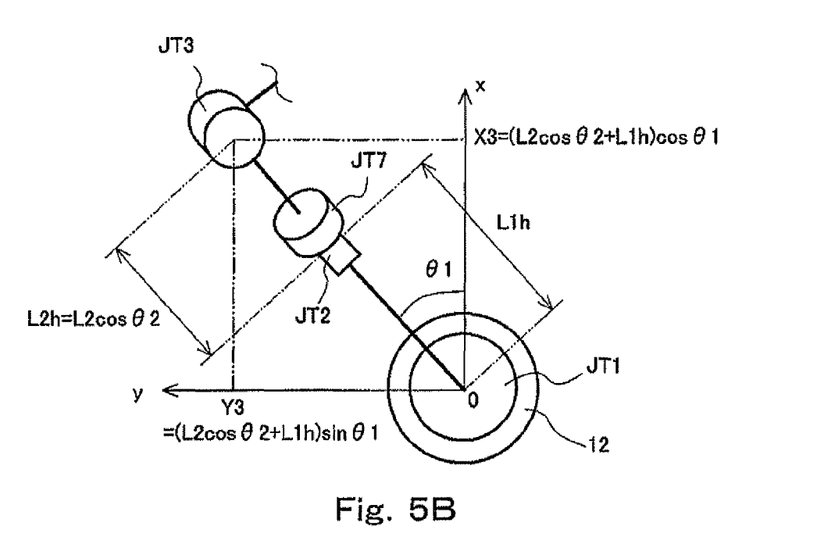
FIG. 5B is a conceptual diagram (plan view) illustrating a position of the elbow portion of the seven-axis articulated robot in the robot system shown in FIG. 1.

More concrete explanation will be made. FIG. 5 is conceptual diagrams showing the position of the elbow portion of the seven-axis articulated robot of the robot system shown in FIG. 1. FIG. 5A is a perspective view, whereas FIG. 5B is a plan view corresponding to FIG. 5A. In FIG. 5B, the view of a part located on the hand end 11 side of the elbow portion E is omitted. As shown in FIGS. 5A, 5B, a vertical distance (height) between the pivot axis A1 of the first joint JT1 and the pivot axis A2 of the second joint JT2 is designated by L1v; a horizontal distance of the same is designated by L1h; a distance between the pivot axis A2 of the second joint JT2 and the pivot axis A3 of the third joint JT3 is designated by L2; an angle of the arm member 14 located between the first joint JT1 and the second joint JT2 relative to the X axis is designated by $\theta 1$; and an angle of the arm members 15, 16 located between the second joint JT2 and the third joint JT3 relative to a horizontal plane is designated by $\theta 2$. A vertical distance (height) L2v between the second joint JT2 and the third joint JT3 is represented by $L2v=L2 \sin \theta 2$. A horizontal distance L2h between the second joint JT2 and the third joint JT3 is represented by $L2h=L2 \cos \theta 2$. Therefore, a z-axis coordinate Ze of the elbow portion E (third joint JT3) is represented by $Ze=L1v+L2 \sin \theta 2$; an x-axis coordinate Xe of the elbow portion E (third joint JT3) is represented by $Xe(L2h+L1h) \cos \theta 1=(L2 \cos \theta 2+L1h) \cos \theta 1$; and a y-axis coordinate Ye of the elbow portion E (third joint JT3) is represented by $Ye=(L2h+L1h) \sin \theta 1=(L2 \cos \theta 2+L1h) \sin \theta 1$. By setting the coordinate representation corresponding to the fixed direction as constraint condition, the motion trajectory of the elbow portion E can be restricted to the associated elbow portion movement restricting plane.

As the result of the above-described inverse transform operation, the control system 2 functions as the control unit 23 to control the respective movements of the pivot axes A1 to A7 (joints JT1 to JT7) in accordance with the calculated pivot angles for the pivot axes A1 to A7 (Step S9).

The above configuration makes it possible to restrict the movement of the elbow portion E within a specified plane (Pz) when teaching the position of the hand end 11, the elbow portion E having the greatest influence next to the hand end 11 upon the movement of the whole of the robot. This transforms the motion trajectory of the elbow portion E during the teaching operation from a three-dimension (space) to a two-dimension (plane), so that imaging of the motion trajectory of the elbow portion E is facilitated. Accordingly, the motion trajectory of the whole robot can be easily grasped and, in consequence, proper teaching can be performed. This reduces the number of working steps and the time taken for start-up of a line.

For example, when the seven-axis articulated robot 1 works under workpieces that section object of the robot's operation, the robot 1 has to work with its whole body being situated below the position where the workpieces are placed. In such a case, the movement of the elbow portion E is restricted within the specified plane Pz by fixing the z-axis coordinate of the elbow portion E, whereby teaching of the seven-axis articulated robot 1 can be properly and quickly performed (there is no need to pay attention to anything but the position of the hand end 11 during the teaching operation), while preventing the seven-axis articulated robot 1 from unexpectedly coming into contact with the workpieces. Further, the plane that restricts the movement of the elbow portion is suitably set according to the shape of the workpieces and the positions of obstacles such as adjacent robots. Thus, teaching of the seven-axis articulated robot 1 can be properly and quickly performed while preventing the seven-axis articulated robot 1 from unexpectedly coming into contact with the workpiece and obstacles.

Although the embodiment of the invention has been described the invention is not necessarily limited to the particular embodiments shown herein and various changes and modifications are made to the disclosed embodiments without departing from the scope of the invention.

Whereas the foregoing embodiment has been discussed about a case where the plane within which the movement of the elbow portion E is restricted is set based on the base coordinate system, the invention is not limited to this but may be applied to cases where the plane is set by fixing the coordinate of one of the coordinate axes of, for example, a tool coordinate system to a specified value. Alternatively, the plane may be set based on other coordinate systems. Also, not only a plane perpendicular to a coordinate axis of a desired coordinate system but also a plane inclined diagonally relative to a coordinate axis may be set.

Whereas the foregoing embodiment has been discussed about a case where the movement restriction control on-off switch touch input section 322 of the input device 3 is operated as a means for determining the plane in the state in which the elbow portion E is located at a desired position, the invention is not limited to this but other method may be used for the determination of the plane as long as the specified plane is properly set. For example, a specified plane may be set beforehand by inputting, to the control system 2, an equation representing the specified plane or a coordinate and a coordinate position to be fixed, using e.g., the input device 3 or other inputting means. In another alternative method, desired three points of the hand end 11 may be input by teaching the seven-axis articulated robot 1 using the input device 3 and the plane including these three points may be set as the specified plane.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The control system and teaching method for a seven-axis articulated robot according to the invention are useful for easily grasping a motion trajectory of the whole robot and thereby performing proper teaching during teaching operation.

REFERENCE SIGNS LIST

1: seven-axis articulated robot
2: control system
3: input device
11: hand end
12: base
13: swivel
14 to 19: arm member
21: setting device
22: computing unit
23: control unit
31: input button group
32: touch panel
311: input buttons
312: button columns constituted by plural button pairs
321: elbow portion fixed direction selection touch input section
322: elbow portion movement restriction control on-off switch touch input section
A1 to A7: pivot axis
E: elbow portion
JT1 to JT7: joint
S: shoulder portion
W: wrist portion

The invention claimed is:

1. A control system for a seven-axis articulated robot having: (i) a hand end provided at a leading end of the seven-axis articulated robot, (ii) at least seven joints arranged in series from a base to the hand end, each of the seven joints having a pivot axis configured to pivot about the pivot axis of a subsequent joint, and (iii) a three-axis shoulder portion, a one-axis elbow portion and a three-axis wrist portion are arranged in series from the base, the control system comprising:
  a setting device configured to set a specified plane in a teaching mode for teaching the seven-axis articulated robot;
  a control unit configured to control a movement of the seven-axis articulated robot so as to restrict a motion trajectory of the elbow portion within the plane set by the setting device; and
  a computing unit configured to perform an inverse transform operation to calculate the pivot angle of each pivot axis based on a change in a position of the hand end, and output the calculated pivot angle of each pivot axis to the control unit, wherein
    when the position of the hand end is taught, restriction of the movement of the elbow portion is applied as a constraint condition in the inverse transform operation.

2. The control system for a seven-axis articulated robot according to claim 1, wherein the plane within which the movement of the elbow portion is restricted is a plane obtained by fixing a coordinate of one of the coordinate axes of a base coordinate system to a specified value, the base coordinate system being set based on the base of the seven-axis articulated robot, or a plane obtained by fixing a coordinate of one of the coordinate axes of a tool coordinate system to a specified value, the tool coordinate system being set based on the hand end of the seven-axis articulated robot.

3. The control system for a seven-axis articulated robot according to claim 2, wherein
  the plane within which the movement of the elbow portion is restricted is a plane obtained by fixing a coordinate of a height direction axis among the coordinate axes of the base coordinate system to a specified value, and
  the computing unit performs the inverse transform operation, using, as constraint condition, a condition in which the pivot angle of a pivot axis which is parallel to the plane of the base and is among the pivot axes of the shoulder portion, is constant.

4. The control system for a seven-axis articulated robot according to claim 1, wherein the setting device is configured to set the specified plane when a specified setting button provided in an input device used for teaching the seven-axis articulated robot is operated with the elbow portion being situated in a specified position, so that the movement of the elbow portion is restricted within the plane including the specified position.

5. A control method for a seven-axis articulated robot having: (i) a hand end provided at a leading end of the seven-axis articulated robot, (ii) at least seven joints arranged in series from a base to the hand end, each of the seven joints having a pivot axis configured to pivot about the pivot axis of the preceding adjacent joint, and (iii) a three-axis shoulder portion, a one-axis elbow portion and a three-axis wrist portion are arranged in series from the base, the control method comprising:

setting a specified plane;

controlling a movement of the seven-axis articulated robot such that a motion trajectory of the elbow portion is restricted within the plane;

performing an inverse transform operation to calculate the pivot angle of each pivot axis based on a change in a position of the hand end;

applying a restriction of the movement of the elbow portion as a constraint condition in the inverse transform operation, if the position for the hand end is taught;

outputting the calculated pivot angle of each pivot axis to the seven-axis robot; and moving one or more of the at least seven joints based on the calculated pivot angles.

\* \* \* \* \*